March 18, 1952     J. W. FOWLER     2,589,610
FISHING SIGNAL
Filed Feb. 20, 1947
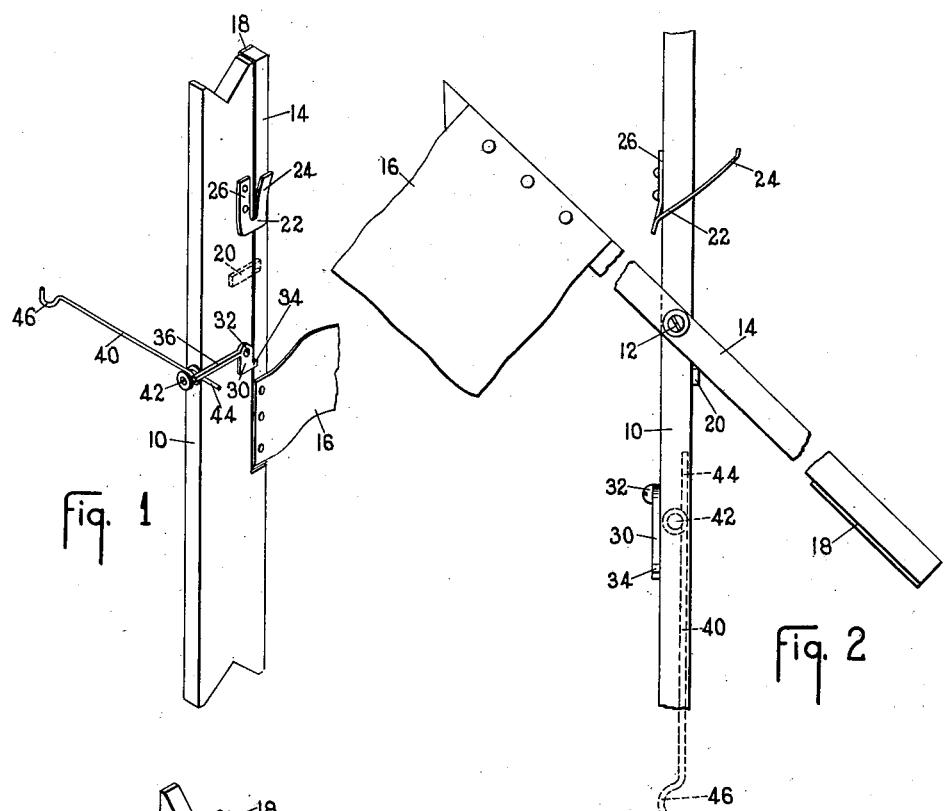
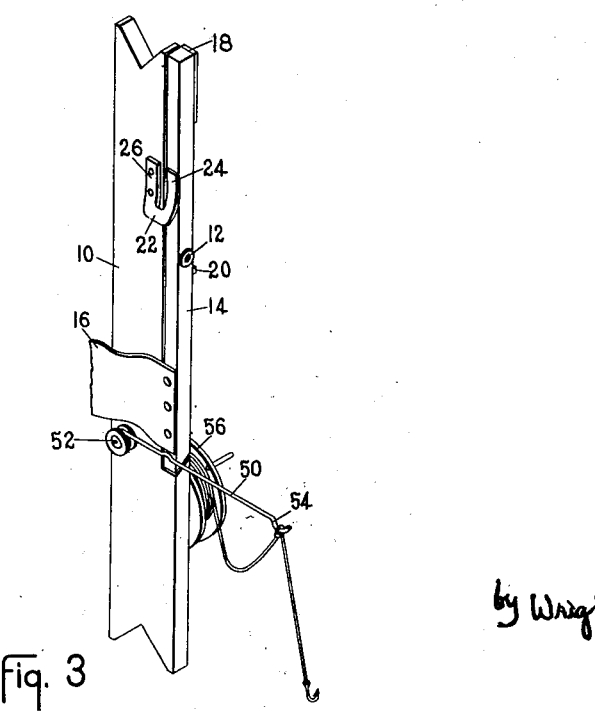
Inventor
John W. Fowler
by Wright, Brown, Quinby & May
Att'ys Patented Mar. 18, 1952

2,589,610

UNITED STATES PATENT OFFICE 2,589,610

FISHING SIGNAL

John W. Fowler, West Newton, Mass.

Application February 20, 1947, Serial No. 729,720

4 Claims. (Cl. 43—17)

This invention relates to an improved signal device for indicating that a string or strand such as a fishing line has been pulled. A common use for a device of this type is in fishing where the fisherman tends a number of fishing lines simultaneously, as in fishing through holes in the ice on the surface of a lake. It is an object of the invention to provide a signal of this type which is reliable in action, simple in structure, and easily observable from a distance.

These and other advantageous features are obtained according to the invention by the use of a flag on a staff pivoted to a standard, the staff being spring-pressed and unbalanced so as to rotate to a predetermined position when released by a latch device operated by a pull on the fishing line.

For a more complete understanding of the invention, reference may be had to the following description thereof, and to the drawing, of which:

Figure 1 is an isometric view of an embodiment of the invention showing the flag attached to a side of the staff;

Figure 2 is an elevational view of the same showing the parts in a different position of operation and the flag attached to an edge of the staff;

Figure 3 is an isometric view of a modified form of the invention.

A fishing signal embodying the invention is illustrated in Figure 1 and comprises a standard 10 which is adapted to be set into the ice in an upright position near a fishing hole. Pivotally secured to an edge of the standard 10 as at 12 is a flag and staff assembly which, as shown, may consist of a staff 14 having a flag 16 secured to one end portion thereof and a suitable counterweight 18 secured at or near the other end thereof. The assembly is mounted in an unbalanced condition so that if left to itself, it tends to rock so as to put the flag 16 uppermost. The staff 14 is adapted to lie alongside of a side edge portion of the standard 10 as indicated in Figure 1 and to rock therefrom to a position indicated in Figure 2 in which the flag 16 is uppermost and the staff is inclined at an acute angle with respect to the upright standard 10. A suitable stop 20 is mounted on the standard to limit the angle of swing through which the staff 14 can rock from its inactive position shown in Figure 1. When the staff assumes the inclined position shown in Figure 2, the flag 16 hangs out in a conspicuous manner so as to be readily observable from a distance by the fisherman who is tending the lines. In order to prevent failure of the staff to swing the flag to its elevated position, a suitable leaf spring 22 is mounted on the standard 10 at a convenient point offset from the axis of the pivot 12. The spring 22 has a portion projecting beyond the adjacent edge of the standard 10 so that it is in a position to be engaged by the staff 14 when the latter is rocked to its inactive position. The spring 22 may be of any convenient shape, but I prefer a U-shape having one leg 24 of the U located beyond the adjacent edge of the standard, the other leg 26 of the U being secured to a side of the standard. This spring can be conveniently bent as desired to regulate the initial impulse.

When the staff 14 has been rocked to the inactive position shown in Figure 1, it is retained in such position by suitable means such as a latch member 30 which is pivotally secured as at 32 to the standard 10. The latch member 30 has a nose 34 which can project beyond the edge of the standard 10 so as to be in the path of movement of the staff 14. When the latch 30 is in this position, it holds the staff in its inactive position against the pressure of the spring 22. The latch member 30 also has an elongated extension 36, the end portion of which projects beyond the opposite edge of the standard 10 when the nose 34 is in its operative position. If the extension 36 is pushed up, the nose 34 is retracted to release the staff 14 and to permit the staff to rock about the pivot 12 to the position shown in Figure 2. The pressure of the spring 22 against the staff insures a prompt initial rocking impulse or kick to get the staff well off center. The unbalanced condition of the staff then causes it to continue in a rocking movement until the staff is stopped by the stop element 20. In case the rocking movement is sufficiently strong to cause the staff to rebound from the stop element 20, it cannot go back to its inactive position since this will be prevented by the spring 22 so that when the staff is released it soon reaches a position of rest in the inclined position shown in Figure 2.

Operation of the latch member 30 may be accomplished by any suitable means such as an operating lever 40 pivotally secured as at 42 to an edge of the standard 10 so that the lever 40 is approximately perpendicular to the extension 36 of the latch member. The lever 40 has a short arm 44 attached to bear on the under side of the projecting portion of the extension 36. On the other side of the pivot 42 the lever 40 extends for a length considerably greater than that of the arm 44, this longer extension terminating in an open loop or hook 46 which is adapted to receive and support a loop in a fishing line in the manner illustrated in Figure 3. A tug or pull on the fishing line, as when a fish strikes at the bait, will rock the lever 40 in such a manner as to push the extension 36 of the latch member upward. This rocks the latch member so as to retract the nose 34, thus releasing the staff 14 which thereupon is swung to the position shown in Figure 2 with the flag 16 uppermost. The double leverage of the operating lever 40 and the extension 36 is effective to release the flag staff in response to a light pull on the hook 46.

Figure 3 shows a modified form of the invention, the difference being in the simplified retaining means for holding the staff 14 in its inactive position alongside the standard 10. Instead of a latch member such as is shown at 30 in Figure 1, a retaining lever 50 may be employed to engage the staff 14 in such a manner as to prevent rocking movement thereof from its inactive position as long as the retaining lever 50 remains in the position shown in Figure 3. The lever 50 is pivotally secured as at 52 to the standard 10, the free end of the lever being in the form of a hook 54 adapted to receive a loop or turn of the fishing line. A pull on the line rocks the lever 50 downward sufficiently to release the staff 14 and to permit the staff to rock about its pivot axis 12 to the position shown in Figure 2. The fishing line shown in Figure 3 may be attached at any desired point to the hook 54, and idle portion of the line may be wound on a suitable reel 56 conveniently mounted on the standard 10.

It is evident that various modifications and changes may be made in the embodiments of the invention herein particularly shown and described without departing from the scope thereof as defined in the following claims.

I claim:

1. A fishing signal comprising an upright standard, a flag and staff assembly pivotally mounted at an intermediate point on said standard to rock about a horizontal axis from a normal position alongside the standard, the staff assembly being unbalanced with the flag at the lighter end whereby the staff tends to swing the flag end upward, means for giving said staff an initial impulse when released from its normal position to rock about its pivot, said means consisting of a leaf spring mounted on said standard in such a position that it is distorted by said staff when the staff is in its normal position, and means positively holding said staff in its normal position and operable to release said staff for rocking movement.

2. A fishing signal comprising an upright standard, a flag staff pivoted adjacent to its mid point to a side edge of said standard, a flag secured to said staff adjacent to an end thereof, a counterweight mounted on said staff at the other end thereof, said counterweight being sufficiently heavy to overbalance the flag end of the staff, a spring secured to said standard only and arranged to press against said staff at a point spaced from the pivot when the staff is in an inactive position alongside the adjacent edge of the standard with the flag end down, means for releasably holding said staff in said inactive position against the pressure of said spring, said means comprising a latch mounted on said standard and projecting beyond the edge thereof to engage said staff and movable to release said staff, and a stop carried by said standard to limit the rotation of the staff when released to a position inclined with respect to the standard and with the flag end up.

3. A fishing signal comprising an upright standard, a flag and staff assembly pivoted to a side of the standard to rock about a horizontal axis from an inactive position alongside the standard with the flag down, said assembly being unbalanced so as to tend to rock to a position in which the flag is up, a U-shaped leaf spring secured by one of its legs to the standard with the other leg projecting beyond the side of the standard to press against said staff when the staff is in its inactive position, and latch means mounted on said standard for releasably holding said staff in its inactive position.

4. A fishing signal comprising a vertical standard, a staff pivoted at an intermediate point thereof to said standard to rock about a horizontal axis, a flag at one end of said staff, a weight at the other end of said staff, a spring mounted on said standard in such a manner as to press against said staff at a point spaced from the pivot tending to start rotation of said staff about said pivot, and a latch member pivoted to said standard to rock about an axis at right angles to the direction of the pivotal axis of the staff, said latch member having a portion engaging said staff at a point spaced from said pivot to prevent rotation of said staff, said portion being movable by rocking movement of the member out of contact with the staff.

JOHN W. FOWLER.

REFERENCES CITED

The following references are of record in the file of this patent:

UNITED STATES PATENTS

| Number | Name | Date |
| --- | --- | --- |
| 75,075 | Talbot | Mar. 3, 1868 |
| 962,420 | Dibbles | June 28, 1910 |
| 1,154,756 | Georgeson | Sept. 28, 1915 |
| 1,516,484 | Meszaros | Nov. 18, 1924 |
| 1,819,034 | Luelloff | Aug. 18, 1931 |
| 1,859,944 | Waitt | May 24, 1932 |
| 2,137,771 | Goodwin | Nov. 22, 1938 |
| 2,295,250 | Zenewich | Sept. 8, 1942 |